US011645400B2

(12) United States Patent
Shinde et al.

(10) Patent No.: US 11,645,400 B2
(45) Date of Patent: May 9, 2023

(54) SECURED INTERPROCESS COMMUNICATION

(71) Applicant: VMWARE, INC., Palo Alto, CA (US)

(72) Inventors: Sachin Shinde, Pune (IN); Shirish Vijayvargiya, Pune (IN)

(73) Assignee: VMware, Inc., Palo Alto, CA (US)

( * ) Notice: Subject to any disclaimer, the term of this patent is extended or adjusted under 35 U.S.C. 154(b) by 483 days.

(21) Appl. No.: 16/693,407

(22) Filed: Nov. 25, 2019

(65) Prior Publication Data

US 2021/0103669 A1 Apr. 8, 2021

(30) Foreign Application Priority Data

Oct. 4, 2019 (IN) .............................. 201941040234

(51) Int. Cl.
*G06F 21/60* (2013.01)
*G06F 9/54* (2006.01)
*G06F 9/455* (2018.01)

(52) U.S. Cl.
CPC ............ *G06F 21/606* (2013.01); *G06F 9/541* (2013.01); *G06F 9/45558* (2013.01); *G06F 2009/45562* (2013.01); *G06F 2009/45583* (2013.01); *G06F 2009/45587* (2013.01)

(58) Field of Classification Search
CPC .... G06F 21/606; G06F 9/541; G06F 9/45558; G06F 2009/45562; G06F 2009/45583; G06F 2009/45587; G06F 21/554; G06F 21/57; G06F 21/53; H04L 63/101; H04L 63/20; H04L 63/0227
See application file for complete search history.

(56) References Cited

U.S. PATENT DOCUMENTS

| | | | | |
|---|---|---|---|---|
| 2011/0113427 | A1* | 5/2011 | Dotan | G06F 21/53 718/1 |
| 2014/0059357 | A1* | 2/2014 | Andersson | G06F 21/602 713/189 |
| 2016/0162685 | A1* | 6/2016 | Feroz | G06F 9/45558 726/22 |
| 2017/0214530 | A1* | 7/2017 | Seibel | H04L 63/0876 |
| 2019/0278910 | A1* | 9/2019 | Zhang | G06F 21/606 |

FOREIGN PATENT DOCUMENTS

| | | | |
|---|---|---|---|
| JP | 2013242644 A | * 12/2013 | |
| WO | WO-2015138931 A1 | * 9/2015 | ............. G06F 17/00 |

OTHER PUBLICATIONS

Caillat, Benjamin, et al. "Prison: Tracking process interactions to contain malware." 2015 IEEE 17th International Conference on High Performance Computing and Communications, 2015, pp. 1282-1291 (Year: 2015).*
Afonso, Vitor, et al. "Going native: Using a large-scale analysis of android apps to create a practical native-code sandboxing policy." The Network and Distributed System Security Symposium. 2016. (Year: 2016).*

\* cited by examiner

*Primary Examiner* — Shin-Hon (Eric) Chen
*Assistant Examiner* — Ethan V Vo

(57) ABSTRACT

The present disclosure describes secured interprocess communication (IPC). The operating system traps application-level IPC calls to an IPC agent, which handles the IPC call. The IPC agent executes in a trusted execution environment so that communications between the applications involved in the IPC are secure. Since processing of IPC by the IPC agent bypasses the operating system, IPC remains secure despite any attacks against the operating system code.

20 Claims, 8 Drawing Sheets

SECURED INTERPROCESS COMMUNICATION

RELATED APPLICATIONS

Benefit is claimed under 35 U.S.C. 119(a)-(d) to Foreign Application Serial No. 201941040234 filed in India entitled "SECURED INTERPROCESS COMMUNICATION", on Oct. 4, 2019, by VMWARE, INC., which is herein incorporated in its entirety by reference for all purposes.

BACKGROUND

It is an increasingly common practice to configure applications and services in a multi-tiered architecture. The software components in a multi-tiered architecture is engineered to partition certain functions such as processing, data management, and presentation across physically and logically separated machines. In other words, the different functions can be hosted on several machines or clusters, ensuring that services are provided without resources being shared so that the services can be delivered at top capacity. A multi-tiered architecture not only improves delivery of services, but also facilitates the management of the software components.

An example of a multi-tiered architecture includes a presentation tier, a logic tier, and a data tier. The presentation tier provides the user interface. This user interface is typically a graphical user interface (GUI) that is accessed through a web browser or web-based application and displays content to an end user. The presentation tier can be often built on web technologies such as HTML5, JavaScript, CSS, or through other popular web development frameworks. The application tier typically constitutes the functional logic that drives an application's core capabilities. The logic that comprises the applications tier can be written in Java, .NET, C#, Python, C++, etc. The data tier comprises of the database or other suitable data storage system. The data tier stores and retrieves information in the data storage system.

The tiers typically communicate with each through suitable application programming interface (API) calls. In the case that the tiers are on different machines, the API calls can be interprocess communication (IPC) calls.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In an application server, services may be partitioned into several service components. Various service components may execute as separate processes and interact with each other via IPC to provide a service. The exchange of data between the service components can include sensitive data and so the service components need to be trusted processes. In accordance with aspects of the present disclosure, an IPC agent executing in a trusted execution environment can bypass IPC communication services provided by the operating system. The IPC agent can provide secured services to support IPC communication between processes. The trusted execution environment can protect IPC communications against attacks on the operating system that could otherwise compromise data being exchanged via IPC.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1A:
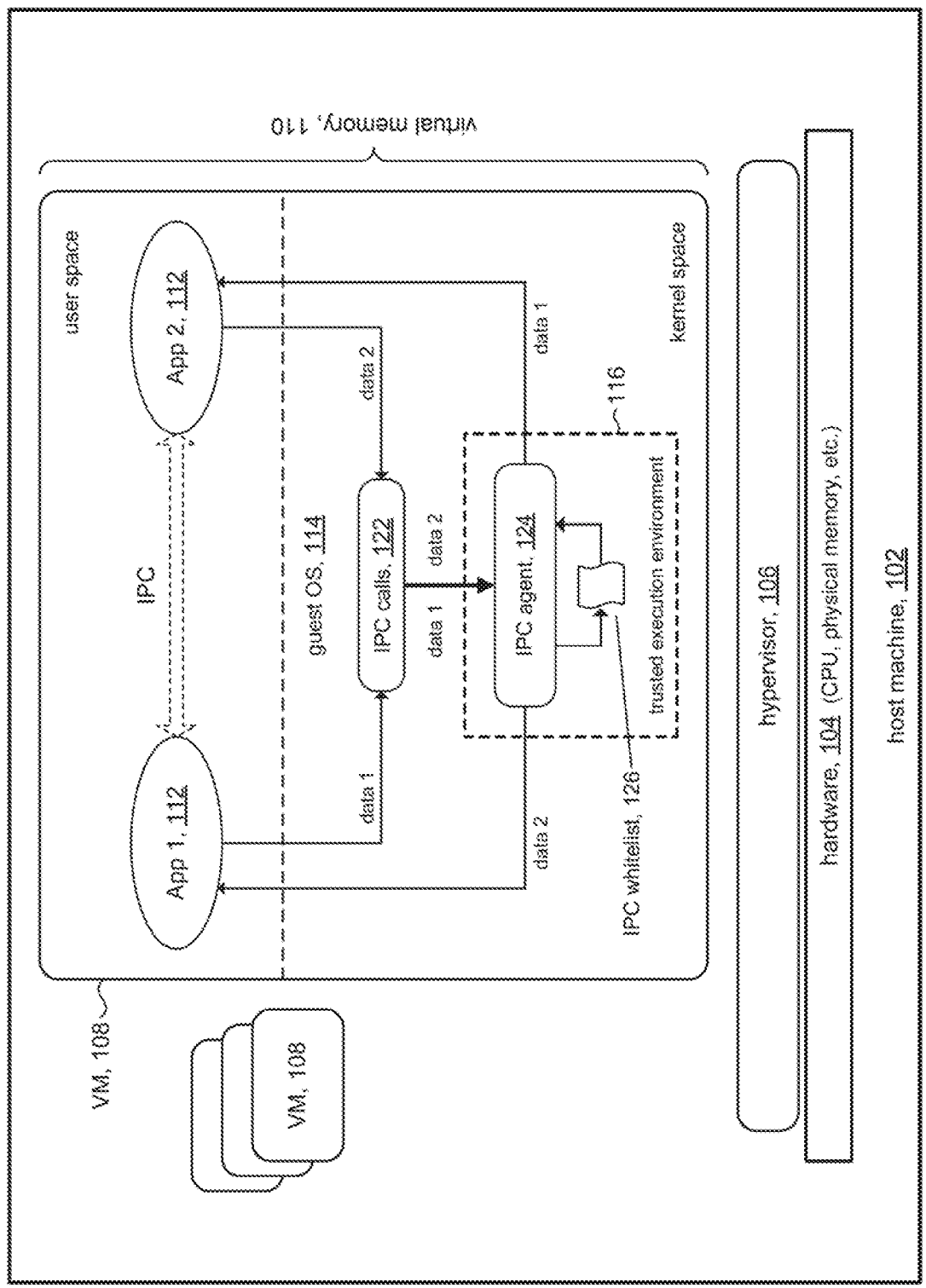
FIG. 1A shows a system configuration in accordance with some embodiments of the present disclosure.

FIG. 1A shows an example of a computing system 100 in accordance with the present disclosure. In some embodiments, for example, computing system 100 can be a virtualization system including a host machine 102 having hardware ('bare metal') components 104 such as a central processing unit (CPU), a physical memory and the like. A hypervisor 106 can provide services that virtualize the hardware components 104 to support the instantiation and execution of one or more virtual machines (VMs) 108. Each VM 108 executes in its corresponding virtual memory 110 which is backed by the physical memory.

The virtual memory 110 in a VM 108 can be divided into a user address space and a kernel address space. User applications 112 can execute in the user space. A guest operating system (OS) 114 can execute in the kernel space. The guest OS 114 provides various services to support the execution of applications 112. Access to the kernel space is generally limited to the guest OS 114 so that applications 112 executing on the VM 108 cannot interfere with or otherwise corrupt operation of the guest OS and the data used by the guest OS to perform its operations.

The guest OS 114 can provide services to support interprocess communication (IPC) between applications 112 to exchange data with each other. The data can be data produced by one application (the data producer) and consumed by the other application (the data consumer). The guest OS 114 can provide a set of IPC system calls 122 to support IPC between applications 112. IPC calls 122 can include functions such as open, create, read, write, and the like.

In accordance with the present disclosure, IPC calls 122 can invoke corresponding code (subroutines, object methods, etc.) collectively referred to as IPC agent 124 to handle the various IPC calls 122. Further in accordance with the present disclosure, data exchanges between applications engaged in IPC can go through the IPC agent 124. FIG. 1A, for example, shows that data produced by application App 1 flows through IPC agent 124 in order to reach application APP 2 Likewise, data produced by application App 2 flows through IPC agent 124 in order to reach application APP 1. In some embodiments, the IPC agent 124 can use an IPC whitelist 126 to authorize IPC between applications 112. These aspects of the present disclosure are discussed below.

In accordance with the present disclosure, the code comprising IPC agent 124 and the data comprising IPC whitelist 126 can be loaded in a trusted execution environment (TEE) 116 that is set up in the guest OS 114. The trusted execution environment 116 is a region of the kernel space that is isolated from the guest OS 114. As the name suggests, the trusted execution environment ensures that processes execute in a secured and trusted environment and that data can likewise be stored and processed in a protected environment. Technologies for implementing trusted execution environments are known. TEE technologies can be hardware based; for example, the Intel® Software Guard Extensions (SGX) is a set of security-related instruction codes that are built into some modern Intel® CPUs. TEE technologies can be provided in software; e.g., the VMware® Guest Monitoring Mode (GMM) technology executes in a VM and provides a special mode that allows code to execute in the same context as the VM's guest OS, but keeps this code completely isolated from all processes executing on the VM including guest OS processes. GMM enables security sensitive code to execute within the guest OS. The present disclosure is explained with the understanding that the disclosed embodiments use GMM to provide a trusted execution environment, with the understanding that other TEE technologies can be used in accordance with the present disclosure.

As explained, the trusted execution environment 116 is a region of memory in the memory address space (kernel space) of the guest OS114 that is isolated from, and thus inaccessible by, all other processes running in the VM 108 (including privileged processes like the VM's guest OS kernel processes); in other words, the region of memory that constitutes the trusted execution environment 116 is not visible to any process executing on the VM 108. Accordingly, when the IPC agent 124 executes in the trusted execution environment 116, the IPC agent 124 cannot be compromised via attacks within the VM 108, including attacks that target the guest OS 114. Likewise, the IPC whitelist 126 is stored in the trusted execution environment 116 and thus cannot be compromised via attacks within the VM 108, including attacks that target the guest OS 114.

Figure 1B:
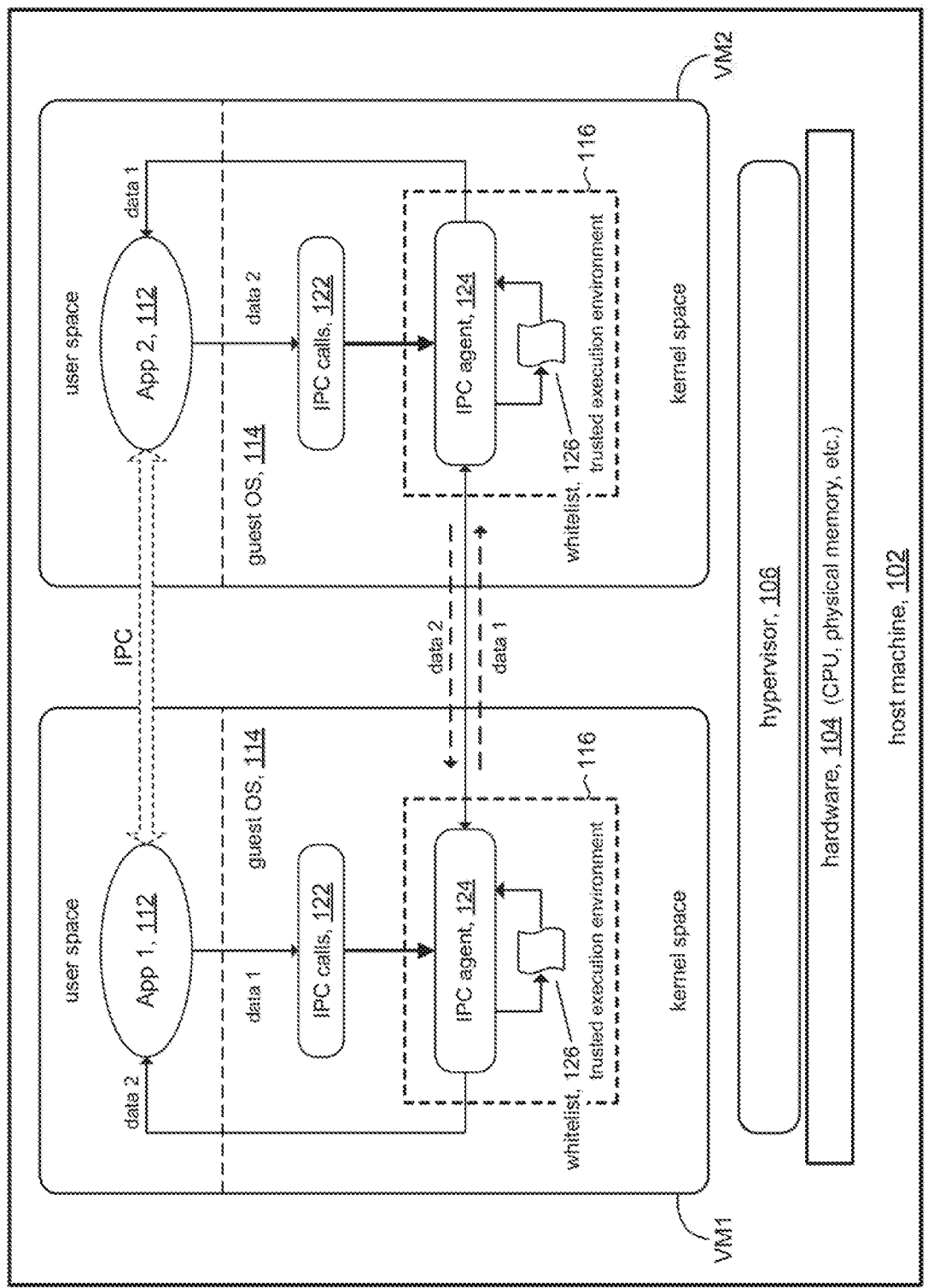
FIG. 1B shows another system configuration in accordance with some embodiments of the present disclosure.

FIG. 1B shows a configuration of computing system 100 in accordance with another embodiment of the present disclosure. The configuration in FIG. 1B shows two VMs VM1, VM2. Each VM VM1, VM2 is configured for IPC communication in accordance with the present disclosure. Application App 1 on VM1 can communicate with application App 2 on VM2. In some embodiments, the respective IPC agents 124 in VM1 and VM2 can coordinate with each other to provide IPC communication across multiple VMs.

Figure 1C:
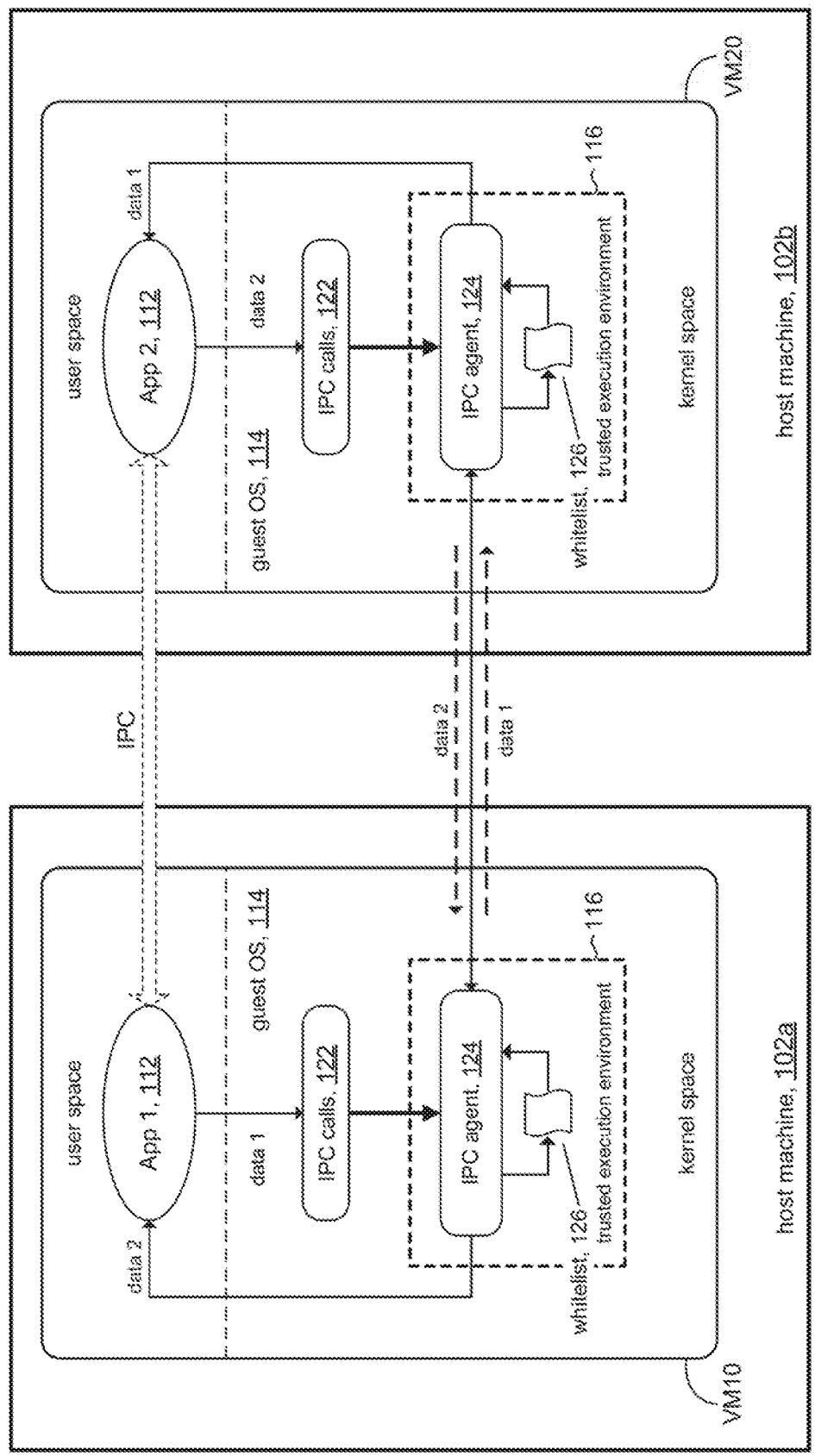
FIG. 1C shows yet another system configuration in accordance with some embodiments of the present disclosure.

FIG. 1C shows a configuration of computing system 100 in accordance with another embodiment of the present disclosure. The configuration in FIG. 1B shows two VMs VM10, VM20 instantiated in two host machines 102*a*, 102*b*. Each VM VM10, VM20 is configured for IPC communication in accordance with the present disclosure. Application App 1 on VM10 can communicate with application App 2 on VM20. In some embodiments, the respective IPC agents 124 in VM10 and VM20 can coordinate with each other to provide IPC communication across multiple VMs.

The configuration shown in FIG. 1A will be used as an example to illustrate embodiments of the present disclosure. It will be understood that processing in the VM shown in FIG. 1A is applicable to VMs VM1 and VM2 depicted in FIG. 1B and in to VMs VM10 and VM20 shown in FIG. 1C.

Figure 2:
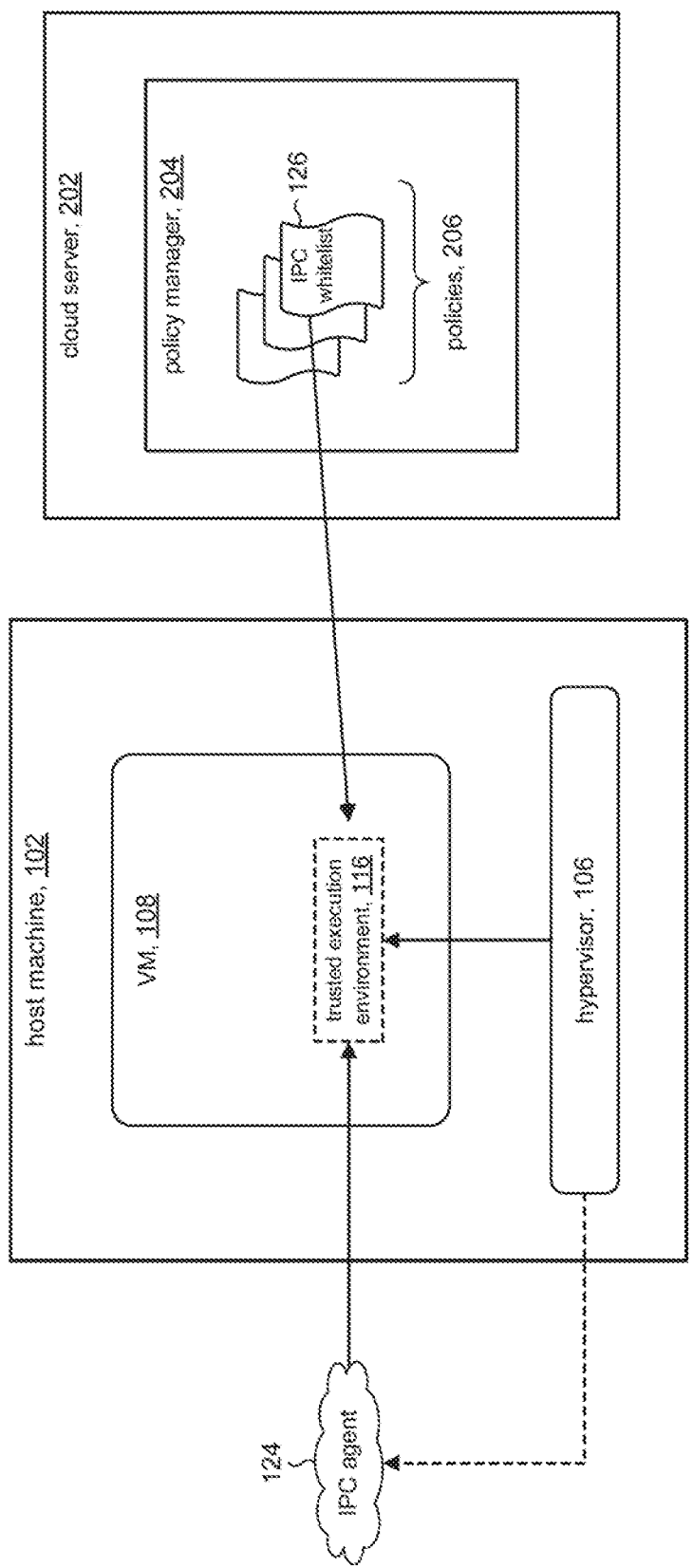
FIG. 2 shows additional detail to the system diagram of FIG. 1AA in accordance with some embodiments.

FIG. 2 illustrates additional details in accordance with some embodiments of the present disclosure. In some embodiments, for example, as part of the process of instantiating the VM 108, the hypervisor 106 can set up the trusted execution environment 116 in the address space of the VM 108. The hypervisor 106 can load the IPC agent 124 for execution in the trusted execution environment 116. In some embodiments, the IPC whitelist 126 can likewise be stored in the trusted execution environment 116. In some embodiments, the IPC whitelist 126 can be based on a policy or policies 206 maintained by a policy manager 204 in an enterprise. In some embodiments, the policy manager 204 can be provided on cloud server 202. It will be appreciated, however, that the IPC whitelist 126 can be maintained in any suitable way.

Figure 3:
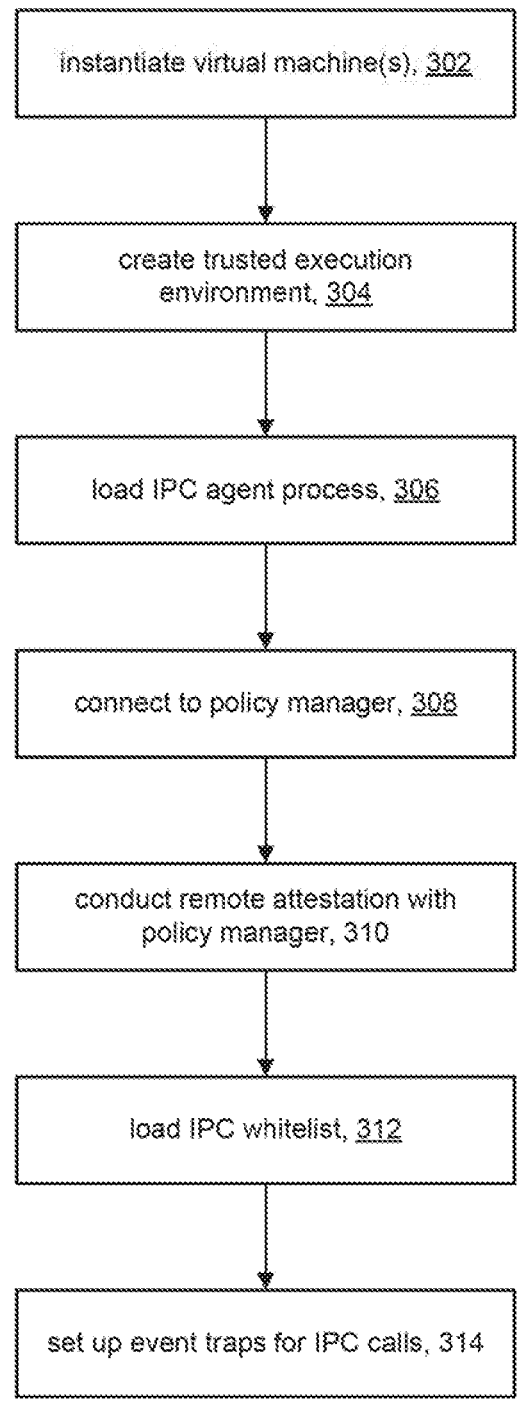
FIG. 3 shows processing in accordance with some embodiments.

Referring to FIG. 3, the discussion will now turn to a high level description of processing in the host machine 102 to load the IPC agent 124 in accordance with the present disclosure. In some embodiments, for example, the host machine 102 can include computer executable program code, which when executed by a processor (e.g., 612, FIG. 6), can cause the host machine to perform processing in accordance with FIG. 3. The flow of operations performed by the host machine is not necessarily limited to the order of operations shown.

At operation 302, the host machine (via the hypervisor 106, FIG. 1) can instantiate one or more virtual machines (e.g., 108, FIG. 1A). The process of instantiating a VM includes the hypervisor allocating virtual memory for the VM from the physical memory of the host machine and then powering on or otherwise booting up the VM to load the guest OS.

At operation 304, the host machine can create a trusted execution environment (e.g., 116, FIG. 1A) in the kernel address space of the guest OS. The trusted execution environment is a region of memory in the kernel space that cannot be accessed by guest OS processes, and so is secured against attacks on the guest OS. In some embodiments, for example, a GMM can be installed in the VM. The GMM can provide services for setting up and maintaining the trusted execution environment.

At operation 306, the host machine (via the hypervisor) can load an IPC agent (e.g., 124, FIG. 1A) into the trusted execution environment and initiate execution of the IPC agent. In some embodiments, the IPC agent can be a collection of subroutines, object methods, etc. The code comprising the IPC agent can be loaded into the trusted execution environment. The IPC agent can include initialization code that the hypervisor can invoke to allow the IPC agent to initialize the trusted execution environment. In some embodiments, for example, the IPC agent can be a hosted component.

At operation 308, the host machine (via the initialization code in the IPC agent) can establish a network connection to a policy manager (e.g., 204, FIG. 2).

At operation 310, the host machine (via the initialization code in the IPC agent) can conduct a remote attestation with the policy manager to verify that the trusted execution environment in genuine and that the correct IPC agent is loaded in the trusted execution environment. Remote attestation is a method by which the IPC agent can authenticate its hardware and software configuration to the policy manager. The goal of remote attestation is to enable the policy manager to determine a level of trust in the integrity of the trusted execution environment. When the IPC agent is verified, a secure communication channel between the IPC agent and the policy manager is established.

At operation 312, the host machine (via the initialization code in the IPC agent) can obtain a list of known, trusted processes, referred to as the IPC whitelist (e.g., 126, FIG. 1A). The IPC agent can store the IPC whitelist in the trusted execution environment so as to protect the integrity of the list. Processes on the IPC whitelist are deemed to be secured for the purposes of IPC communication. In an application server, for instance, services may be partitioned into several service components. Various service components may execute as separate processes and interact with each other via IPC to provide a service. The exchange of data between the service components can include sensitive data and so the service components need to be trusted processes. In some embodiments, a system administrator or other policymaking entity can create the IPC whitelist. In other embodiments, the IPC whitelist can be autonomously created. For example, a newly created VM can be instantiated in a controlled environment. The VM can be put in a learning mode and be exposed in the controlled environment to various simulations of actual operating scenarios. Processes that interact with each other are noted (e.g., by monitoring applications that invoke IPC), and their attributes are recorded in the IPC whitelist in protected mode. Suppose, for instance, a process App1 (with parameters p1,p2, attributes a1,a2 and properties prop1, prop2) communicates with Process App2 (with parameters p3,p4, attributes a3,a4 and properties prop3, prop4). In learning mode, all these details can be collected in protected mode and pushed as a policy into the IPC whitelist.

At operation 314, the host machine (via the initialization code in the IPC agent) can set up event traps to trap IPC calls. Conventional IPC calls are handled in the guest OS. For example, the guest OS can provide application-level IPC calls that an application can invoke to access IPC functionality such as open, read, write, and so on. The IPC calls into the guest OS can be trapped by a software interrupt mechanism. Referring to FIG. 4A, for example, an application-level IPC call made by an application executing in the user address space can be compiled into an OS-level system call (_syscall) in the guest OS. The system call can trigger a software interrupt. The IPC_OPEN parameter in the system call can be used to index into an entry in an interrupt vector table 402 that points to kernel code 404 in the guest OS to handle the IPC call. FIG. 4A illustrates examples for some IPC calls.

Figure 4B:
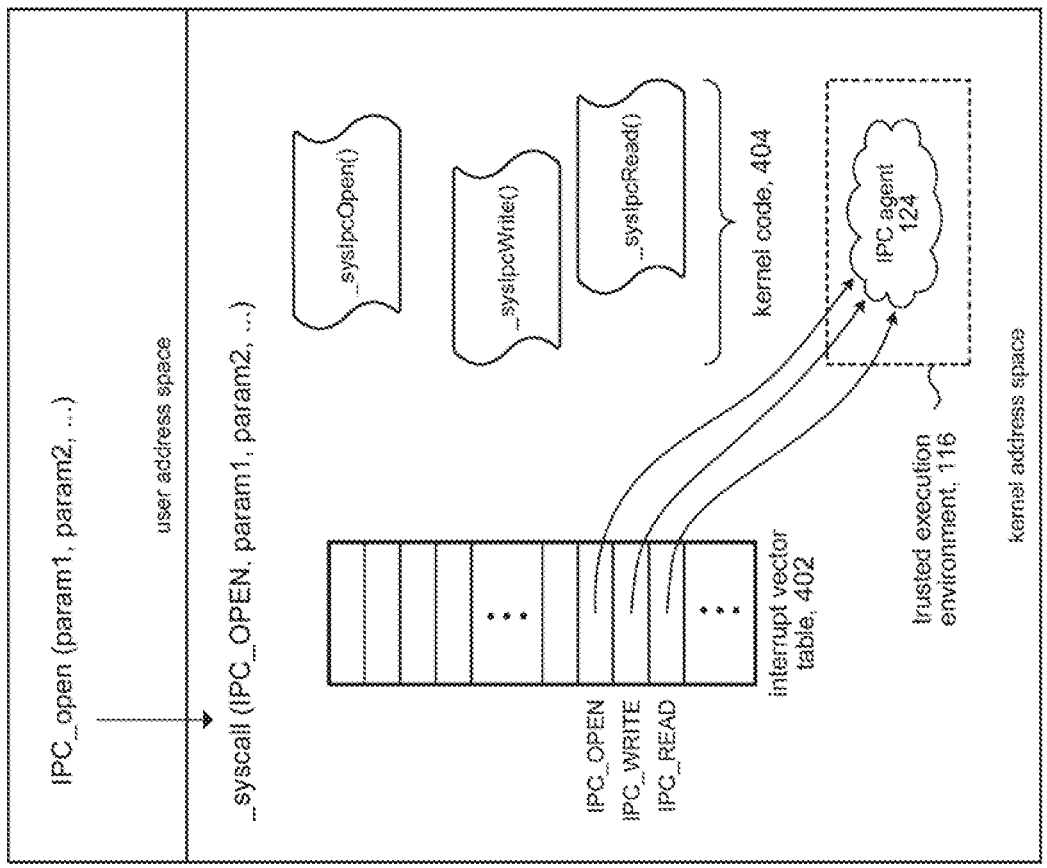
FIGS. 4A and 4B illustrate trapping IPC calls in accordance with some embodiments.
Figure 4A:
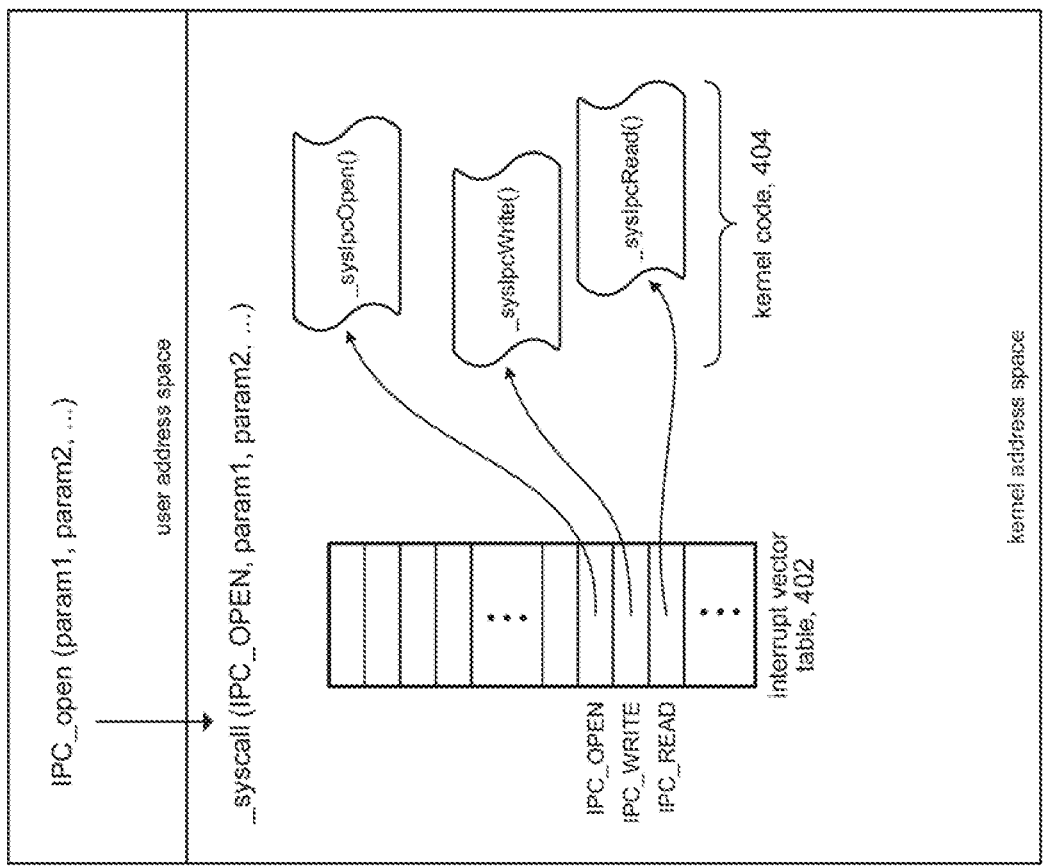

Referring to FIG. 4B, in accordance with some embodiments of the present disclosure, the IPC agent can alter the interrupt vector table 402 to trap the IPC calls. In some embodiments, for example, the IPC agent can set addresses in IPC-related entries the interrupt vector table 402 to point to corresponding code (e.g., IPC agent subroutines, methods, etc.) in the trusted execution environment to handle the different IPC calls. In other embodiments (not shown), the interrupt vector table 402 can trap all IPC-related calls to a common dispatcher routine in the IPC agent. The dispatcher can then dispatch the trapped IPC call to appropriate code in the IPC agent. Addresses in the interrupt vector table are set up early in the boot process, before any drivers and processes are loaded, so there is no opportunity for attacks to the interrupt vector table. After the OS boots up, the interrupt table address range can be monitored and any attempts can be detected. As such, the contents of the interrupt vector table can be deemed to be secured.

Figure 5:
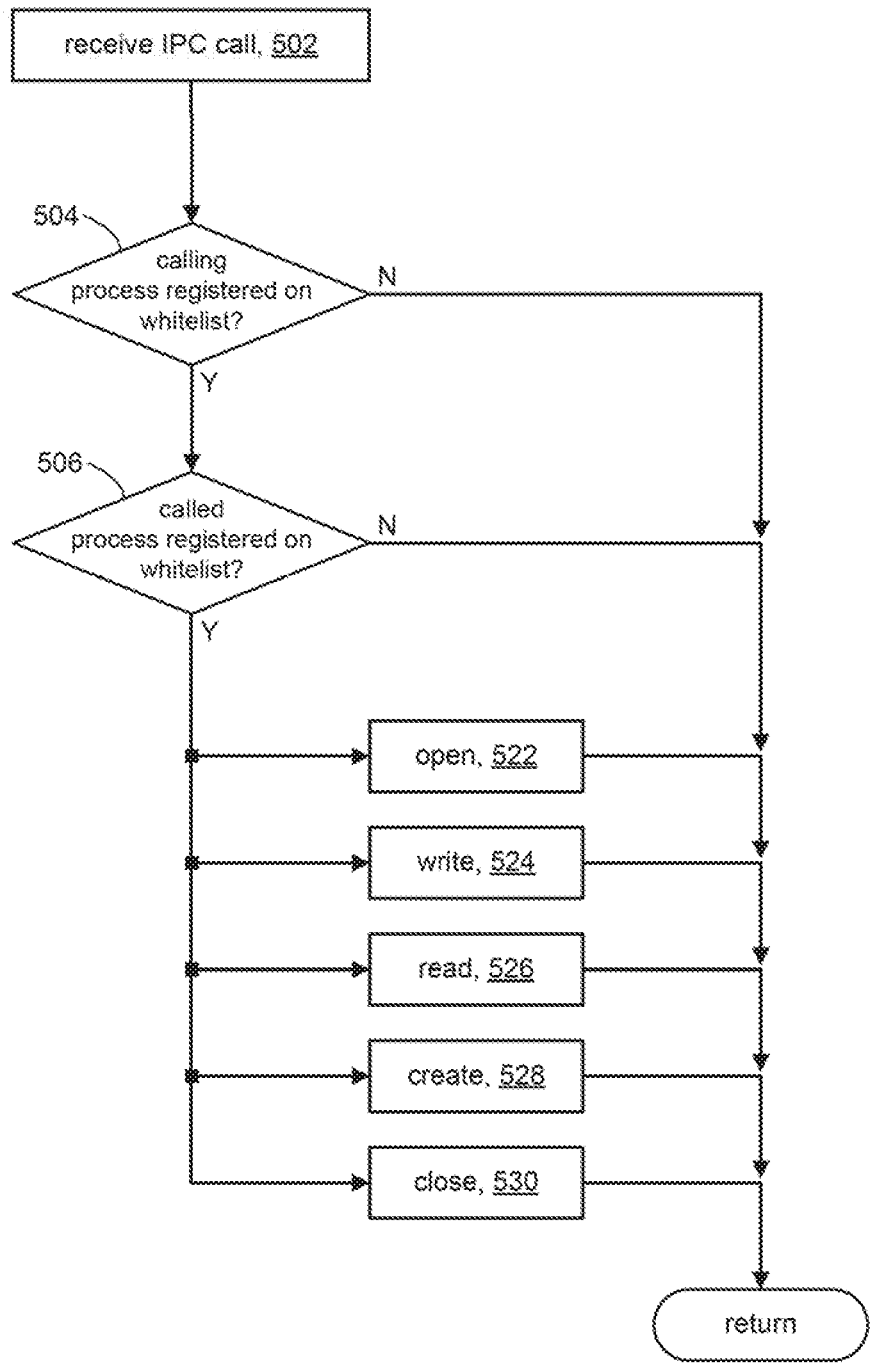
FIG. 5 shows processing in accordance with some embodiments.

Referring to FIG. 5, the discussion will now turn to a high level description of processing in the IPC agent 124 in accordance with the present disclosure. In some embodiments, for example, the IPC agent can include computer executable program code, which when executed by a processor (e.g., 612, FIG. 6) in the host machine 102, can cause the host machine to perform processing in accordance with FIG. 5. The operations are described from the point of view of the IPC agent. For example, the operations can be performed in separate independently invoked routines that comprise the IPC agent. This configuration is illustrated in FIG. 4B, where the interrupt vector table 402 traps IPC calls to separate routines in the IPC agent. In other embodiments (not shown), the operations of FIG. 5 can be performed in a dispatcher routine in the IPC agent, where all IPC calls are trapped to the dispatcher and the dispatcher in turn invokes code in the IPC agent corresponding to the IPC call.

At operation 502, the IPC agent can receive an IPC call (invocation) from a process (e.g., App 1, FIG. 1A). As explained above in connection with FIG. 4B, in accordance with the present disclosure, IPC calls can be trapped and diverted to the IPC agent executing in the trusted execution environment instead being handled in the kernel space (e.g., kernel code 404) of the guest OS.

Verify Processes

At operation 504, the IPC agent can verify the calling process. An IPC operation involves a "calling" process, which refers to the process that invoked the IPC call. The IPC agent can verify that the calling process is on the IPC whitelist. Recall from above, that the IPC whitelist is a precompiled list of known, trusted processes. The IPC whitelist can include attributes for each trusted process such as a checksum of the binary (executable) code, the process name, package details of the process, a hash value computed from the binary code, a security certificate, digital signature, and so on. The IPC agent can compare attributes in the IPC whitelist against the attributes of the candidate process. If the attributes of the candidate process matches corresponding attributes in the IPC whitelist, the candidate process can be deemed "verified" and processing can continue; otherwise, the candidate process is not verified and the IPC agent can do nothing. In some embodiments, the IPC agent can log the attempt of a non-whitelisted process to register itself for IPC. By verifying the calling process each time an IPC call is made, any attacks made on the process during its instantiation can be detected and appropriate action can be taken.

At operation 506, the IPC agent can verify the called process. An IPC operation may involve a "called" process, which is the process that is the target of the IPC call; e.g., data can be sent to the called process, data can be requested from the called process, and so on. The IPC agent can verify that the called process is on the IPC whitelist, in the same way as described above in operation 504 for the calling process. If the called process is on the IPC whitelist, then the called process can be deemed verified and processing can continue. Otherwise, the IPC agent can do nothing, or in some embodiments the IPC agent can log the attempt of a non-whitelisted process to perform an IPC operation. By verifying the called process each time an IPC call is made, any attacks or made on the process during its instantiation can be detected and appropriate action can be taken.

IPC Operations

At operation 522, the IPC agent can handle an OPEN operation to open an IPC channel between the calling process and the called process.

At operation 524, the IPC agent can handle a WRITE operation to send data from the calling (data producer) process to the called (data consumer) process. In some embodiments, for example, the IPC agent can read or otherwise capture the data identified in the IPC call made by the producer process. In some embodiments, for example, the IPC call can include the actual data to be read or a pointer in the address space of the producer process to the data to be read. The IPC agent can then write or otherwise forward that data to the consumer process. In some embodiments, for example, the IPC call can include a pointer into the address space of the consumer process. The IPC agent can write the data into the address space of the consumer process. In other embodiments, the IPC agent can communicate the data to the consumer process over an IPC channel.

At operation 526, the IPC agent can handle a READ operation to send data from the calling process to the called process. In some embodiments, when read request is done by the consumer process, the IPC agent can emulate a traditional READ call and share the enclave-based protected memory with the consumer process.

At operation 526, the IPC agent can handle a CREATE operation to send data from the calling process to the called process. The IPC agent can emulate the traditional CREATE call and perform multiple operations such as process registration validation, parameter and attributes validation and so on.

At operation 530, the IPC agent can handle a CLOSE operation. In some embodiments, for example, the IPC agent can remove the calling process from the list of verified processes discussed above in connection with operation 506.

Figure 6:
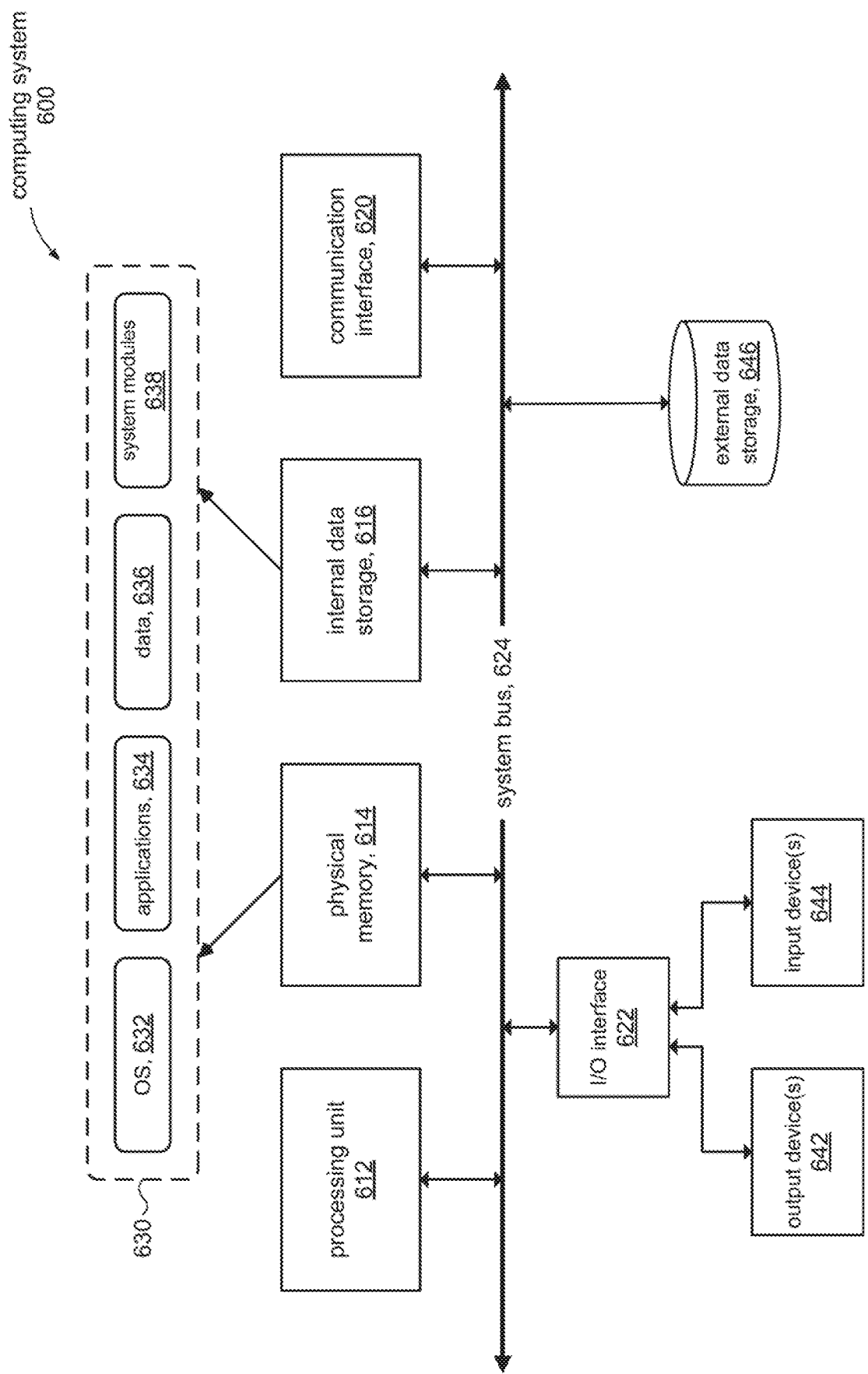
FIG. 6 shows a computing system for use in accordance in with some embodiments.

FIG. 6 is a simplified block diagram of an illustrative computing system 600 for implementing one or more of the embodiments described herein (e.g., host machine 102, FIG. 1A). The computing system 600 can perform and/or be a means for performing, either alone or in combination with other elements, operations in accordance with the present disclosure. Computing system 600 can also perform and/or be a means for performing any other steps, methods, or processes described herein.

Computing system 600 can include any single- or multi-processor computing device or system capable of executing computer-readable instructions. Examples of computing system 600 include, for example, workstations, laptops, servers, distributed computing systems, and the like. In a basic configuration, computing system 600 can include at least one processing unit 612 and a system (main) memory 614.

Processing unit 612 can comprise any type or form of processing unit capable of processing data or interpreting and executing instructions. The processing unit 612 can be a single processor configuration in some embodiments, and in other embodiments can be a multi-processor architecture comprising one or more computer processors. In some embodiments, processing unit 612 can receive instructions from program and data modules 630. These instructions can cause processing unit 612 to perform operations in accordance with the various disclosed embodiments (e.g., FIGS. 3, 5) of the present disclosure.

Physical memory 614 can be any type or form of storage device or storage medium capable of storing data and/or other computer-readable instructions, and comprises volatile memory and/or non-volatile memory. Examples of physical memory 614 include any suitable byte-addressable memory, for example, random access memory (RAM), read only memory (ROM), flash memory, or any other similar memory architecture. Although not required, in some embodiments computing system 600 can include both a volatile memory unit (e.g., physical memory 614) and a non-volatile storage device (e.g., data storage 616, 646).

In some embodiments, computing system 600 can include one or more components or elements in addition to processing unit 612 and physical memory 614. For example, as illustrated in FIG. 6, computing system 600 can include internal data storage 616, a communication interface 620, and an I/O interface 622 interconnected via a system bus 624. System bus 624 can include any type or form of infrastructure capable of facilitating communication between one or more components comprising computing system 600.

Internal data storage 616 can comprise non-transitory computer-readable storage media to provide nonvolatile storage of data, data structures, computer-executable instructions, and so forth to operate computing system 600 in accordance with the present disclosure. For instance, the internal data storage 616 can store various program and data modules 630, including for example, operating system 632, one or more application programs 634, program data 636, and other program/system modules 638 to support and perform various processing and operations disclosed herein.

Communication interface 620 can include any type or form of communication device or adapter capable of facilitating communication between computing system 600 and one or more additional devices. For example, in some embodiments communication interface 620 can facilitate communication between computing system 600 and a private or public network including additional computing systems; e.g., cloud server 202 in FIG. 2.

Computing system 600 can also include at least one output device 642 (e.g., a display) coupled to system bus 624 via I/O interface 622, for example, to provide access to an administrator. The output device 642 can include any type or form of device capable of visual and/or audio presentation of information received from I/O interface 622.

Computing system 600 can also include at least one input device 644 coupled to system bus 624 via I/O interface 622, e.g., for administrator access. Input device 644 can include any type or form of input device capable of providing input, either computer or human generated, to computing system 600. Examples of input device 644 include, for example, a keyboard, a pointing device, a speech recognition device, or any other input device.

Computing system 600 can also include external data storage subsystem 646 coupled to system bus 624. In some embodiments, the external data storage 646 can be accessed via communication interface 620. External data storage 646 can be a storage subsystem comprising a storage area network (SAN), network attached storage (NAS), virtual SAN (VSAN), and the like. External data storage 646 can comprise any type or form of block storage device or medium capable of storing data and/or other computer-readable instructions. For example, external data storage 646 can be a magnetic disk drive (e.g., a so-called hard drive), a solid state drive, a floppy disk drive, a magnetic tape drive, an optical disk drive, a flash drive, or the like.

These and other variations, modifications, additions, and improvements may fall within the scope of the appended claims(s). As used in the description herein and throughout the claims that follow, "a", "an", and "the" includes plural references unless the context clearly dictates otherwise.

Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

What is claimed is:

1. A method comprising:
loading, by a hypervisor of a computer system, an interprocess communication (IPC) agent into a trusted execution environment of a first virtual machine (VM), the trusted execution environment being a region of kernel memory of the first VM that is isolated from all other processes running within the first VM, the loading being performed by the hypervisor at a time of instantiating the first VM;
receiving, by the IPC agent, an IPC request to exchange data between a first process executing within the first VM and a second process executing within a second VM distinct from the first VM;
invoking an IPC agent that executes in a trusted environment;
processing the received IPC request by the IPC agent, including:
determining whether or not the first process is on a list of trusted processes;
determining whether or not the second process is on the list of trusted processes; and
in response to a determination that both the first process and the second process are on the list of trusted processes, exchanging data between the first process and the second process in accordance with the IPC request,
wherein the list of trusted processes is created by:
instantiating one or more third VMs in a controlled environment;
simulating, within the one or more third VMs, one or more operating scenarios of the first and second VMs;
identifying processes that communicate with each other via IPC during the one or more simulated operating scenarios; and
adding the identified processes to the list of trusted processes.

2. The method of claim 1, wherein an exchange of data between the first process and the second process is not performed in response to a determination that either the first process or the second process is not on the list of trusted processes.

3. The method of claim 1, further comprising receiving a registration request from each of the first process and the second process and designating said each process as being on the list of trusted processes when attributes of said each process matches corresponding attributes in the list of trusted processes.

4. The method of claim 1, wherein the first process is a data producer and the second process is a data consumer, the method further comprising capturing data from the data producer in response to a determination that the data producer is on the list of trusted processes and forwarding the captured data in response to a determination that the data consumer is on the list of trusted processes.

5. The method of claim 1, wherein the IPC request corresponds to an operating system (OS) system call, wherein the corresponding OS system call invokes the IPC agent to process the received IPC request.

6. The method of claim 1, further comprising the IPC agent accessing the list of trusted processes and storing the list of trusted processes in the trusted execution environment.

7. A non-transitory computer-readable storage medium having stored thereon computer executable instructions, which when executed by a computer device, cause the computer device to:
load, via a hypervisor of a computer device, an interprocess communication (IPC) agent into a trusted execution environment of a first virtual machine (VM), the trusted execution environment being a region of kernel memory of the first VM that is isolated from all other processes running within the first VM, the loading being performed by the hypervisor at a time of instantiating the first VM;
receive, via the IPC agent, an IPC request to exchange data between a first process executing within the first VM and a second process executing on within a second VM distinct from the first VM;
process the received IPC request by the IPC agent, including:
determining whether or not the first process is on a list of trusted processes;
determining whether or not the second process is on the list of trusted processes; and
in response to a determination that both the first process and the second process are on the list of trusted processes, exchanging data between the first process and the second process in accordance with the IPC request,
wherein the list of trusted processes is created by:
instantiating one or more third VMs in a controlled environment;
simulating, within the one or more third VMs, one or more operating scenarios of the first and second VMs;
identifying processes that communicate with each other via IPC during the one or more simulated operating scenarios; and
adding the identified processes to the list of trusted processes.

8. The non-transitory computer-readable storage medium of claim 7, wherein the computer executable instructions, which when executed by the computer device, further cause the computer device to receive a registration request from each of the first process and the second process and designate said each process as being on the list of trusted processes when attributes of said each process matches corresponding attributes in the list of trusted processes.

9. The non-transitory computer-readable storage medium of claim 7, wherein the first process is a data producer and the second process is a data consumer, the method further comprising capturing data from the data producer in response to a determination that the data producer is on the list of trusted processes and forwarding the captured data in response to a determination that the data consumer is on the list of trusted processes.

10. The non-transitory computer-readable storage medium of claim 7, wherein the IPC request corresponds to an operating system (OS) system call, wherein the corresponding OS system call invokes the IPC agent to process the received IPC request.

11. The non-transitory computer-readable storage medium of claim 7, wherein the computer executable instructions, which when executed by the computer device, cause the IPC agent to access the list of trusted processes and store the list of trusted processes in the trusted execution environment.

12. The non-transitory computer-readable storage medium of claim 7, wherein an exchange of data between the first process and the second process is not performed in response to a determination that either the first process or the second process is not on the list of trusted processes.

13. An apparatus comprising:
one or more computer processors; and
a non-transitory computer-readable storage medium comprising instructions for controlling the one or more computer processors to be operable to:
load, via a hypervisor, an interprocess communication (IPC) agent into a trusted execution environment of a first virtual machine (VM), the trusted execution environment being a region of kernel memory of the first VM that is isolated from all other processes running within the first VM, the loading being performed by the hypervisor at a time of instantiating the first VM;
receive, via the IPC agent, an IPC request to exchange data between a first process executing within the first VM and a second process executing within a second VM distinct from the first VM;
process the received IPC request by the IPC agent, including:
determining whether or not the first process is on a list of trusted processes;
determining whether or not the second process is on the list of trusted processes; and
in response to a determination that both the first process and the second process are on the list of trusted processes, exchanging data between the first process and the second process in accordance with the IPC request,
wherein the list of trusted processes is created by:
instantiating a one or more third VMs in a controlled environment;
simulating, within the one or more third VMs, one or more operating scenarios of the first and second VMs;
identifying processes that communicate with each other via IPC during the one or more simulated operating scenarios; and
adding the identified processes to the list of trusted processes.

14. The apparatus of claim 13, wherein the computer-readable storage medium further comprises instructions for controlling the one or more computer processors to receive a registration request from each of the first process and the second process and designate said each process as being on the list of trusted processes when attributes of said each process matches corresponding attributes in the list of trusted processes.

15. The apparatus of claim 13, wherein the first process is a data producer and the second process is a data consumer, wherein the computer-readable storage medium further comprises instructions for controlling the one or more computer processors to capture data from the data producer in response to a determination that the data producer is on the list of trusted processes and forward the captured data in response to a determination that the data consumer is on the list of trusted processes.

16. The apparatus of claim 13, wherein the IPC request corresponds to an operating system (OS) system call, wherein the corresponding OS system call invokes the IPC agent to process the received IPC request.

17. The apparatus of claim 13, wherein the computer-readable storage medium further comprises instructions for controlling the one or more computer processors to cause the IPC agent to access the list of trusted processes and store the list of trusted processes in the trusted execution environment.

18. The method of claim 1, wherein the first VM runs on the computer system and the second VM runs on another computer system.

19. The non-transitory computer-readable storage medium of claim 7, wherein the first VM runs on the computer device and the second VM runs on another computer device.

20. The apparatus of claim 13, wherein the first VM runs on the apparatus and the second VM runs on another apparatus.

* * * * *